Feb. 3, 1959   D. PERLMAN   2,872,443
PREPARATION OF NEW COBALAMINS
Filed Dec. 13, 1956
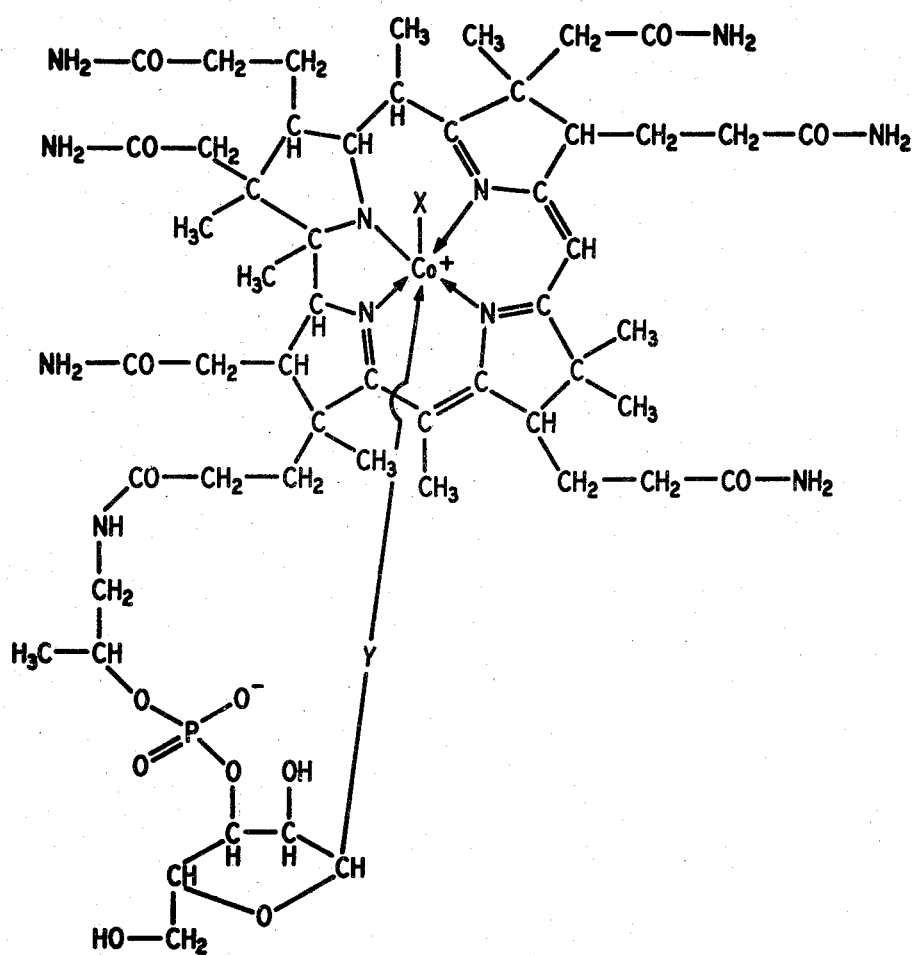

United States Patent Office 2,872,443
Patented Feb. 3, 1959

2,872,443

PREPARATION OF NEW COBALAMINS

David Perlman, Princeton, N. J., assignor to Olin Mathieson Chemical Corporation, New York, N. Y., a corporation of Virginia Application December 13, 1956, Serial No. 628,191

2 Claims. (Cl. 260—211.5)

This invention relates to new cobalamins and, more particularly, to (quinazolin-1,3-diyl)-hydroxo-cobalamins and salts thereof [the nomenclature herein is based on Bernhauer et al., Angew. Chemie, 66, 776 (1954)]; and to a biosynthetic method of producing these new cobalamins employing suitable precursors.

The new compounds of this invention may be represented by the structural formula shown in the appended drawing, wherein X is an anion (for example, an hydroxy radical or the anion of an acid, preferably a pharmacologically acceptable acid), and Y is a (quinazolin-1,3-diyl) group attached to the —X— cobalamin moiety through both the nuclear hetero atoms. Examples of suitable anions of an acid are the anions of the mineral acids (e. g., chloride, bromide, sulfate, nitrite and nitrate), cyanide, cyanate, etc. The compounds of this invention can thus be termed (quinazolin-1,3-diyl)-X-cobalamins, [e. g., (2,4-dihydro-4-oxoquinazolin-1,3-diyl)-hydroxo - cobalamin; (2,4 - dihydro - 4 -oxoquinazolin-1,3 - diyl) - cyano - cobalamin; (8 - amino - 4 - methoxyquinazolin - 1,3 - diyl) - chloro - cobalamin; (1,2,3,4-tetrahydro - 2,4 - dioxoquinazolin - 1,3 - diyl) - sulfato-cobalamin)]. The compounds of this invention are biologically active and, hence, can be used in lieu of vitamin $B_{12}$ (5,6-dimethylbenzimidazole-cyano-cobalamin) in promoting growth of chicks. For this purpose, they are administered in the same manner as vitamin $B_{12}$ (e. g., as supplements to chick feeds or by injection), the respective dose of the particular (quinazolin-1,3-diyl)-X-cobalamin depending on its potency relative to vitamin $B_{12}$.

Precursors utilizable in the production of the (quinazolin-1,3-diyl)-X-cobalamins of this invention include both unsubstituted and mono or polysubstituted quinazolines; or their salts (acid-addition or quaternary salts) and other derivatives containing a functional amino group. Examples of utilizable quinazolines include: alkyl-substituted quinazolines (such as :8-isopropylquinazoline; 2(4, 5, 6, 7 or 8) methylquinazoline; 5,6-dimethylquinazoline; 4-trifluromethyl-quinazoline; and 8-isopropyl-5-methylquinazoline); amino (or its functional derivative)-substituted quinazolines [such as: 2,4-diaminoquinazoline; 2 - amino - 5 - isopropylquinazoline; 5 - chloro - 6 - nitroquinazoline; 4 - chloro - 6 - methoxy - 8 - nitroquinazoline; 2 - acetamidoquinazoline; 4-acetamidoquinazoline]; halo - substituted quinazoline [such as: 4-chloro-6-methoxy-quinazoline; 2,4-dichloroquinazoline; 4,6-dichloroquinazoline; and 4-chloroquinazoline]; hydroxy-substituted quinazolines [such as: 2,4-dihydroxyquinazoline; and 2(or 4)-hydroxyquinazoline]; alkoxy-substituted quinazolines (such as: 4-methoxyquinazoline; 6,7-dimethoxyquinazoline; 2-ethoxy-4-methoxyquinazoline; 8-methoxyquinazoline; thio-substituted quinazolines (such as: 2,4-quinazolinedithiol; and 2-methyl-4 - methylthioquinazoline). Unsubstituted hydrogenated (quinazoline-1,3-diyls) and hydrogenated (quinazolin-1,3-diyls) substituted by divalent radicals, such as oxo or thiono, can also be employed [these are exemplified by: 4(3H)quinazolinone; 4(3H)quinazoline; 2(1), 4(3)-quinazolinedione; and 2-ethyl-4(3H)-quinazolinethione].

To prepare the (quinazolin-1,3-diyl)-X-cobalamins of this invention, a Propionibacterium (such as *Propionibacterium thoenii*, *Propionibacterium rubrum*, *Propionibacterium peterssonii*, *Propionibacterium zeae*, *Propionbacterium pentosaceum*, and, preferably, *Propionibacterium arabinosum*) is grown under substantially anaerobic conditions in a suitable medium containing a quinazoline precursor, as explained hereinbefore, such as 2,4-dichloroquinazoline.

The sources of carbon, nitrogen and cobalt, utilizable as media components in this process, are those normally employed in the preparation of vitamin $B_{12}$. The resultant (quinazolin-1,3-diyl)-hydroxo-cobalamin is then converted, in situ, to (quinazolin-1,3-diyl)-cyano-cobalamin by treatment of the culture or separated cells (preferably the latter) with potassium cyanide or other cyanide-containing salt, and the cyano-cobalamin is isolated as more fully detailed in Example 1. The resultant cyano-cobalamin can then be converted to hydroxo-cobalamin and thence to other salts of (quinazolin-1,3-diyl)-cobalamin by methods known in the art [see Kaczka et al., Jour. Amer. Chem. Soc., 73, 3569 (1951)] to yield products which are also biologically active.

The following examples illustrate the invention (all temperatures being in centigrade):

EXAMPLE 1

*(3,4-dihydro-4-oxoquinazolin-1,3-diyl)-cyano-cobalamin*
$(X=CN)$

Thirty liters of a medium containing (per liter): glucose, 30 g.,; autolyzed yeast, 20 g.; $Co(NO_3)_2.6H_2O$, 0.01 g.; tap water, 1 liter; are placed in a stainless steel fermentation unit of 38 liters capacity, heated at 121° for 30 minutes and cooled to 30°. About 2,000 ml. of a slurry of $CaCO_3$ (containing 600 g. of $CaCO_3$), sterilized by autoclaving, is then added together with 1 liter of *Propionibacterium arabinosum* (American Type Culture Collection catalogue number 4965, Washington, D. C.) culture grown on this medium for 72 hours in flasks shaken on a reciprocating shaker (120–1 inch strokes per minute), located in a 30° constant temperature room. A sterile aqueous-alcoholic solution of 4(3H) quinazolinone (sterilized by filtration through a fritted glass filter) containing 1 mg. per ml. is then added so that the final concentration of added compound is 5 mg. per liter (this supplementation being repeated at 24-hour intervals), and the culture is allowed to grow in the medium, under virtually anaerobic conditions while being agitated with a turbine mixer rotating at 87 R. P. M. After 72 hours incubation at 30°, a sterile solution of glucose is added so that the concentration of the glucose after addition is 30 g. per liter. After 5 days of incubation, the pH of the mixture is about 5.3. The fermenated medium is then passed through a Sharples Super Centrifuge, or the cells containing (3,4-dihydro-4-oxoquinazolin-1,3-diyl)-hydroxo-cobalamin are separated by filtration through a bed of filter-aid (Celite).

The collected cells are resuspended in 3 liters of propanol-water (80:20) containing 1 g./liter of potassium cyanide, and the suspension is heated at 80–90° for 20 minutes. After filtration, the filtrate is concentrated to about 750 ml. The pH is adjusted with 10 N sodium hydroxide to about 7.5, and 25 g. of activated carbon (Darco G60) is added and the mixture stirred. The activated carbon is removed by filtration and eluted with 700 ml. of acetone-water (65:35 v./v.), containing 0.1 g./liter of potassium cyanide. The acetone is concentrated to 400 ml., and filtered to remove suspended material. After filtration, the filtrate is successively extracted with three equal volumes of phenol-benzene (70 parts 88% phenol-30 parts benzene). The non-aqueous layer is separated, pooled and diluted with benzene so that the ratio of benzene to phenol is 15:1. The solution is extracted three times with 200 ml. portions of water, and the aqueous extracts are pooled and concentrated to about 50 ml. The resultant solution is mixed with 1.5 volumes of benzyl alcohol, and the rich-water is saturated with ammonium sulfate. The benzyl alcohol layer is separated, and the aqueous layer is reextracted with one-tenth its volume of benzyl alcohol. The rich benzyl alcohol extracts are combined and dried with sodium sulfate and chromatographed on an activated alumina column. The column is washed with 1 part of methanol and 2 parts of acetone. The rich material is eluted with methanol and the eluate dried under vacuum. The residue is dissolved in a minimum of water and acetone is added until slightly turbid. On standing for several days, (3,4-dihydro-4-oxoquinazolin-1,3-diyl)-cyano-cobalamin in the form of red needlelike crystals is recovered. Spectroscopic examination shows maxima at 278, 361, 520 and 500 mu $[E^{1\%}_{1cm}\ 204(361)]$ The product, (3,4-dihydro-4-oxoquinazolin-1,3-diyl)-cyano-cobalamin, is readily obtained, under the same conditions, using *Propionibacterium pentosaceum* (ATCC Number 4875) or *Propionibacterium peterssonii* (ATCC Number 4870) in place of *Propionibacterium arabinosum* in Example 1.

To show the homogeneity and activity of the (3,4-dihydro-4-oxoquinazolin-1,3-diyl)-cyano-cobalamin of this invention, the following tests were conducted. For these tests the cyano-cobalamin was dissolved in water at a concentration of 100 micrograms of cyano-cobalamin per ml. of water:

TEST I

The solution of (3.4-dihydro-4-oxoquinazolin-1,3-diyl)-cyano-cobalamin is dried on a filter paper strip of Whatman 3 MM paper in parallel with samples of 5,6-dimethylbenzimidazole - cyano - cobalamin, adenine - cyano - cobalamin, 2-methyl-adenine-cyano-cobalamin, and Ford's factor B [Ford et al., Biochem. Jour., 59, 86 (1955)]. The sheet is placed in an ionophoresis apparatus [similar to that described by Holdsworth in Nature, 171, 148 (1953)], and the paper is impregnated with a solution of 0.5 M acetic acid containing 0.02% KCN (w./v.). A potential of about 280 volts is applied for about 17 hours. The sheet is removed and dried. When dry (and free from odor of acetic acid), it is applied for 15 minutes to the surface of an agar plate seeded with a suspension of a vitamin $B_{12}$-requiring strain of *Escherichia coli* (ATCC 11105). [The agar medium contains (grams/liter): sucrose, 20 g.; citric acid, 1.2 g.; $(NH_4)_2PO_4$, 0.4 g.; KCl, 0.08 g.; $MgCl_2 \cdot 6H_2O$, 0.418 g.; $MnCl_2 \cdot 4H_2O$, 0.036 g.; $FeCl_3 \cdot 6H_2O$, 0.023 g.; $ZnCl_2$, 0.021 g.; $CoCl_2 \cdot 6H_2O$, 0.04 g.; agar, 15 g.; triphenyl tetrazolium chloride, 1 g.]. After 18 hours incubation at 37°, the agar plate is observed. The positions of zones of growth of the bacteria (noted as red zones due to the reduction of the tetrazolium dye to the colored formazan) are noted in relation to the location on the paper strip where the samples were applied. When the samples from the fermentation supplemented with the 4(3H)quinazolinone are analyzed in this way, zones of growth parallel to those obtained when 5,6-dimethylbenzimidazole-cyano-cobalamin (neutral ionophoretically), adenine-cyano-cobalamin and factor B are found, with the largest zone in the "neutral" area.

TEST II

Another aliquot of the solution is applied to a spot about 3 inches from the end of a strip of Whatman No. 4 filter paper parallel to spots of known cobalamins. The chromatogram is developed by the descending method using a solvent mixture containing: sec.-butanol, 77 ml.; $H_2O$, 23 ml.; KCN solution (5% w./v.), 0.25 ml.; and $KClO_4$, 100 mg., for 24 hours (at 35°). The strip is dried and applied to the seeded agar plate as above. After incubations, the zones of growth, representing the presence of vitamins of the $B_{12}$ group (measured with reference to the movement of 5,6-dimethylbenzimidazole-cyano-cobalamin), were 0.6, with smaller zones of growth corresponding to 0.3 (adenine-cyano-cobalamin) and 1.30 (factor B).

TEST III

Another aliquot of the solution is applied to a spot about 3 inches from the end of strip of Whatman No. 4 filter paper parallel to spots of known cobalamins. The chromatogram is developed by the descending method using a solvent mixture containing: sec.-butanol, 100 ml.; $H_2O$, 50 ml.; KCN [5% solution (w./v.)], 0.25 ml.; acetic acid (glacial), 1.0 ml. After 17 hours development (at 35° C.), the strips are dried and plated on seeded agar plates as above. A zone of growth with a mobility of about 0.35 of that obtained when the 5,6-dimethylbenzimidazole-cyano-cobalamin was added is found, with smaller zones in the area of mobility about 0.65 and 1.45 that of the 5,6-dimethylbenzimidazole-cyano-cobalamin (corresponding to adenine-cyano-cobalamin and factor B respectively).

A similar test using concentrated $NH_4OH$ in place of acetic acid may also be used.

TEST IV

Another aliquot is assayed for the presence of substances stimulating the growth of *Lactobacillus leichmannii* (ATCC 7830) using as standard 5,6-dimethylbenzimidazole-cyano-cobalamin and the method in the U. S. Pharmocopia (15th edition). A value of about 0.9 mg. per liter is obtained. A second aliquot is assayed by the method of Ford and Porter [Brit. J. Nutrition, 7, 326 (1953)], using the growth response of *Ochromonas malhamensis*, and the 5,6-dimethylbenzimidazole-cyano-cobalamin as standard; a value of about 0.25 mg. per liter is obtained. When an aliquot from an unsupplemented fermentation is analyzed by these procedures, no growth stimulation of the Ochromonas culture is found (less than 0.003 mg. per liter), and no evidence for production of ionophoretically neutral cobalamins is obtained.

TEST V

Another aliquot is assayed for the presence of substances stimulating the growth of chicks, using the procedure described by Lillie et al. [Poultry Science, 33, 686 (1954)] with replacement of BY500 and bone meal with riboflavin and dicalcium phosphate. After 4 weeks' growth, the chicks grown on the ration supplemented with the (3,4 - dihydro - 4 - oxoquinazolin-1,3-diyl)-cyano-cobalamin were approximately equal in weight to those grown on the ration supplemented with an equal weight (based on the *Lactobacillus leichmannii* bioassay) of vitamin $B_{12}$.

EXAMPLE 2

*(3,4-dihydro-4-oxoquinazolin-1,3-diyl)-hydroxo-cobalamin (X=OH)*

To a solution of 10 mg. of (3,4-dihydro-4-oxoquinazolin-1,3-diyl)-cyano-cobalamin in 10 ml. of water is added 50 mg. of platinum oxide catalyst, and the mixture is shaken with hydrogen at atmospheric pressure for 24 hours. The filtrate from the catalyst is evaporated in vacuo at 25°. The residue is dissolved in 1 ml. of water and 12 ml. of acetone are added. Dark red crystals of (3,4-dihydro-4-oxoquinazolin - 1,3 - diyl) - hydroxo - cobalamin on standing for several days. Spectroscopic examination shows maxima at 315, 352, 415 and 530 mu $[E^{1\%}_{1cm}\ 170]$

EXAMPLE 3

*(3,4-dihydro-4-oxoquinazolin-1,3-diyl)-chlor-cobalamin (X=Cl)*

10 mg. of (3,4-dihydro-4-oxoquinazolin-1,3-diyl)-hydroxo-cobalamin is dissolved in 3 ml. of water and the solution adjusted to pH 4 with 0.1 N hydrochloric acid. The solution is then diluted with 10 ml. of acetone, and after a short time the chloro-cobalamin begins to crystallize in the form of dark red needles. The crystals are separated by centrifuging, washed with acetone and dried.

Similarly, by substituting hydrobromic acid, sodium nitrite and acetic acid, potassium cyanate and dilute sulfuric acid for the hydrochloric acid in the procedure of Example 3, the corresponding bromo, nitro, cyanato and sulfato-cobalamins, respectively, are obtained.

EXAMPLE 4

Five hundred ml. aliquots of the medium described in Example 1 are placed in 1 liter Erlenmeyer flasks. The flasks are plugged with non-absorbent cotton and autoclaved for about 20 minutes at 121° C. When the liquid has cooled to room temperature, 10 grams of $CaCO_3$ powder (sterilized by heating in a 150° C. oven for 2 hours) are added. This medium is then inoculated with 10 ml. of a 72 hours old culture of *P. arabinosum* prepared as described in Example 1. To the inoculated medium is added 2 ml. of an alcoholic solution of a suitable quinazoline precursor so that the level of added quinazoline precursor is 10 mg. per liter of medium. This supplementation is repeated daily for 7 days. The flasks are then placed on a reciprocating shaker (120–1 inch cycles per minute) located in a incubator maintained at 30° C. After 3 days incubation, 20 ml. of a sterile glucose solution (50 grams glucose per 100 ml. solution) are added to each flask. At the end of the 7 day incubation period the fermented medium (pH is about 5.4) is heated at 90°–95° C. for 30 minutes and then centrifuged. Sufficient KCN is added to the supernatant liquid to give a concentration of 0.1 g. per liter. The liquid is then extracted thrice with ½ its volume of a phenol-benzene solution (70:30). The phenol-benzene layers are pooled and diluted with an equal volume of n-butanol. Distilled water equal to 1/10 the volume of the mixture is added, and the mixture shaken vigorously and then centrifuged. The red colored aqueous layer containing the cobalamin is analyzed by the tests given in Example 1. The cobalamin present can be isolated by the chromatographic procedure (on alumina) described in Example 1.

When the precursor added to the fermentation is 2,4 dichloroquinazoline, the cobalamin formed (2,4-dichloroquinazolin-1,3-diyl)-cyano-cobalamin is ionophoretically neutral (at pH 2.5). It has a mobility of 0.9 that of 5,6 dimethylbenzimidazole-cyano-cobalamin in the filter paper chromatographic system containing sec-butanol, water, KCN, and acetic acid. In the system containing sec-butanol, water, KCN, and $KClO_4$, the mobility is about 0.1 that of the 5,6 dimethylbenzimidazol-cyano-cobalamin.

When the precursor added to the fermentation is 4-chloro-8-nitroquinazoline, the cobalamin formed (4-chloro-8-nitroquinazolin-1,3-diyl) - cyano - cobalamin is ionophoretically neutral (at pH 2.5). It has a mobility equal to 5,6-dimethylbenzimidazole-cyano-cobalamin in the filter paper chromatographic system containing sec-butanol, water, KCN and acetic acid. In the system containing sec-butanol, water, KCN and $KClO_4$ the mobility is about 0.9 that of the 5,6-dimethylbenzimidazole-cyano-cobalamin.

When the precursor added to the fermentation is 2(1),4(3)-quinazolinedione, the cobalamin formed (1,2,3,4-tetrahydro - 2,4 - dioxoquinazolin - 1,3 - diyl) - cyano-cobalamin, is ionophoretically neutral (at pH 2.5). It has a mobility of about 0.4 that of 5,6-dimethylbenzimidazole-cyano-cobalamin in the filter paper chromatographic system containing sec-butanol, water, KCN and acetic acid.

When the precursor added to the fermentation is 8-amino-4-methoxyquinazoline, the cobalamin formed, (8-amino - 4 - methoxyquinazolin - 1,3 - diyl) - cyano - cobalamin, is ionophoretically neutral (at 2.5). In the filter paper chromatographic test using the solvent system containing sec-butanol, water, KCN and ammonium hydroxide it has a mobity of 0.3 relative to that of 5,6-dimethylbenzimidazole-cyano-cobalamin.

When the precursor added to the fermentation is 2-ethyl 4(3H)-quinazolinethione, the cobalamin formed, (3,4 - dihydro - 2 - ethyl - 4 - thiono - quinazolin - 1,3-diyl)-cyano-cobalamin is ionophoretically neutral (at pH 2.5). In the filter paper chromatographic test using the solvent system containing sec-butanol, water, KCN and $KClO_4$ it has a mobility of 0.45 relative to that of 5,6-dimethylbenzimdazole-cyano-cobalamin.

When the precursor added to the fermentation is 2-methyl-4-methylthio-quinazoline, the cobalamin formed, (2 - methyl - 4 - methylthioquinazolin - 1,3 - diyl)-cyano-cobalamin, moves at the same rate as adenine cobalamin in the ionophoresis (pH 2.5). In the filter paper chromatographic test using the solvent system containing sec-butanol, water, KCN and acetic acid it has the mobility of 0.64 relative to that of 5,6-dimethylbenzimidazole-cyano-cobalamin. In the system containing sec-butanol, water, KCN and ammonium hydroxide it has a mobility of 0.28 relative to that of 5,6-dimethylbenzimidazole-cyano-cobalamin; and in the system containing sec-butanol, water, KCN and $KClO_4$ the mobility is about 0.48 that of 5,6-dimethylbenzimidazole-cyano-cobalamin.

When the precursor added to the fermentation is 2,4-quinazolinedithiol, the cobalamin formed, (2,4-dithio-quinazolin-1,3-diyl)-cyano-cobalamin, moves at the same rate as adenine cobalamin in the ionophoresis (pH 2.5). It has a mobility of 0.24 that of 5,6-dimethylbenzimidazole-cyano-cobalamin in the filter paper chromatographic test using the solvent system containing sec-butanol, water, KCN and acetic acid. In the system containing sec-butanol, water, KCN, and ammonium hydroxide, the mobility is about 0.65 that of the 5,6-dimethylbenzimidazole-cyano-cobalamin. In the system containing sec-butanol, water, KCN and $KClO_4$, the mobility is about 0.36 that of the 5,6-dimethylbenzimidazole-cyano-cobalamin.

In the practice of this invention, the isolated new cobalamin (or a fermentation residue or concentrate containing the new cobalamin, such as the dried fermentation medium) can be employed advantageously as an animal feed supplement.

The invention may be variously otherwise embodied within the scope of the appended claims.

I claim:

1. A compound selected from the class consisting of (3,4 - dihydro - 4 - oxoquinazolin - 1,3 - diyl) - hydroxo-cobalamin and the cyanide salt thereof.

2. (3,4 - dihydro - 4 - oxoquinazolin - 1,3 - diyl)-cyano-cobalamin.

References Cited in the file of this patent

UNITED STATES PATENTS

| | | |
|---|---|---|
| 2,595,499 | Wood et al. | May 6, 1952 |
| 2,650,896 | McDaniel et al. | Sept. 1, 1953 |
| 2,719,843 | Davoll et al. | Oct. 4, 1955 |
| 2,728,763 | Mamalis et al. | Dec. 27, 1955 |
| 2,763,642 | Porter et al. | Sept. 18, 1956 |

OTHER REFERENCES

Bernhauer et al.: "Angewandte Chemie," 66:24, Dec. 21, 1954, pages 776–780 relied.

UNITED STATES PATENT OFFICE

CERTIFICATE OF CORRECTION

Patent No. 2,872,443                                                     February 3, 1959

David Perlman

It is hereby certified that error appears in the printed specification of the above numbered patent requiring correction and that the said Letters Patent should read as corrected below.

Column 1, line 15, for "now" read -- new --; line 43, for "rose" read -- dose --.

Signed and sealed this 19th day of May 1959.

(SEAL)
Attest:

KARL H. AXLINE                                                ROBERT C. WATSON
Attesting Officer                                       Commissioner of Patents